United States Patent [19]

Bratten

[11] Patent Number: 4,481,108

[45] Date of Patent: Nov. 6, 1984

[54] BELT FILTER

[76] Inventor: Jack R. Bratten, 5970 St. James Dr., West Bloomfield, Mich. 48033

[21] Appl. No.: 445,052

[22] Filed: Nov. 29, 1982

[51] Int. Cl.³ .............................................. B01D 29/02
[52] U.S. Cl. .................................... 210/137; 210/144; 210/387
[58] Field of Search ............... 210/111, 400, 386, 387, 210/DIG. 3, 401, 137, 144

[56] References Cited

U.S. PATENT DOCUMENTS

| 3,706,378 | 12/1972 | Markwick | 210/400 |
| 3,899,426 | 8/1975 | Hirs | 210/387 |
| 3,982,499 | 9/1976 | Frankl | 210/386 |
| 4,159,948 | 7/1979 | Crowe | 210/111 |
| 4,377,479 | 3/1983 | Pierson | 210/400 |

FOREIGN PATENT DOCUMENTS 2052291 1/1981 United Kingdom ......... 210/DIG. 3

Primary Examiner—John Adee
Attorney, Agent, or Firm—John R. Benefiel

[57] ABSTRACT

A belt type filter is disclosed in which a length of disposable filter sheet material is dispensed from a roll to extend through the interior space of a tank, over a pervious section of the tank bottom communicating with a collection chamber receiving filtered liquid from the tank after passing through the filter belt.

The filter belt side edges extend within recesses along either side of its path through the tank interior space with an inflatable seal extending along each recess to secure and seal the edges thereof at all points below the level of liquid in the tank. The filter belt is periodically advanced to dispose a fresh section of filter over the collection chamber either manually or under automatic control sensing the vacuum generated by a circulating pump connected to the collection chamber. The advancing of the filter belt is by an arrangement including clamping cylinders and a rotary indexing drive each associated with a rotatably mounted roller receiving the contaminated filter belt material as it passes out of the tank.

9 Claims, 5 Drawing Figures

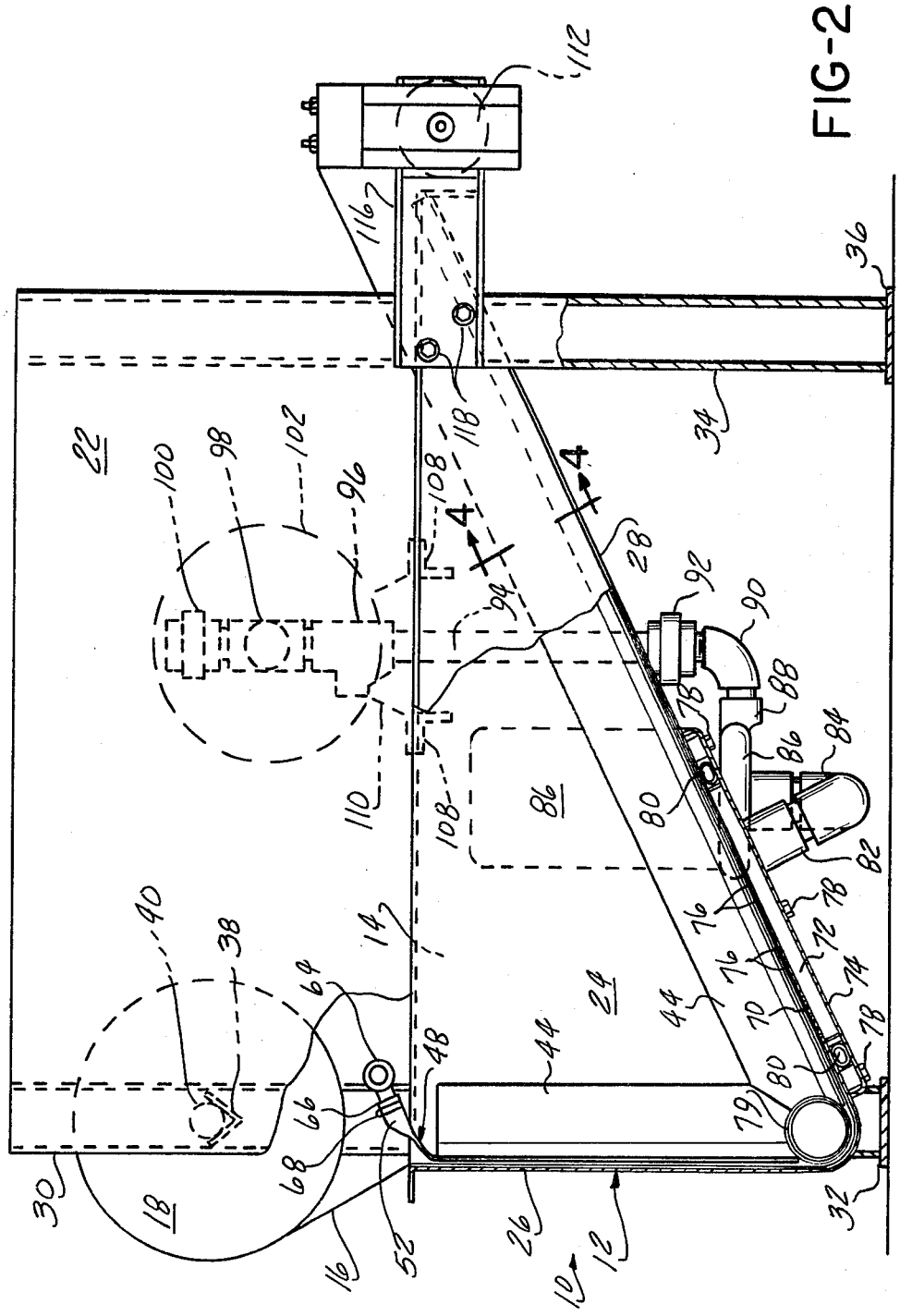

BELT FILTER

BACKGROUND OF THE INVENTION

The present invention relates to filters and more particularly to belt filters of the type adapted to filter liquids such as cutting and coolant liquids used in the machining of manufactured parts.

Filters have long been used for such applications in which a flexible strip of sheet material comprising the filter media is caused to be advanced through the interior space of a filter tank, which filter tank receives the unfiltered liquid.

The filter belt passes along the bottom of the tank and in the lower region thereof a perforated or otherwise open partition is overlapped by a section of the filter belt. Upon development of a suction pressure in a collection chamber beneath the open partition, filtering flow of the liquid will occur through the filter belt, into the collection chamber and thence to return to the system.

Continuous loops of chain are typically mounted along either side of the tank lying atop the filter belt side edges extending through the tank interior space. Typically, chain flights extend across the width of the belt to enable carrying off of the filter cake or sludge accumulating atop the filter belt as the filtration process proceeds.

This arrangement is used in relatively large sized tanks and depends on the chains being disposed along either edge of the filter belt in order to weigh down the edges of the filter belt and create a sealing engagement with the tank bottom to prevent bypass flow of the dirty liquid past the filter belt.

U.S. Pat. No. 3,091,336 to Hirs is typical of such filters.

This arrangement is highly successful, but involves relatively elaborate structure including power driven chains and relatively complex drive systems are necessitated.

In some instances, a permanent type belt filter is utilized, a relatively costly construction which requires backwashings, scraping, precoating, etc., greatly increasing the complexity of the apparatus.

In U.S. Pat. No. 4,159,948 there is disclosed a similar filter arrangement in which a disposable filter media is moved through the tank in similar fashion without the use of a permanent conveyor belt or chains. In order to seal the edges of the filter belt, a liquid seal is employed at the side and back edges of the length of filter material disposed in the tank. This liquid seal is achieved by use of a clean liquid receiving reservoir located at the rear side of the tank and maintained at a higher liquid level to provide an inflow of clean liquid along the periphery of the tank. This requires a diversion of flow from the system, which may substantially impair the capacity of the system. This also requires an auxiliary tank, complicating the tank structure.

DISCLOSURE OF THE INVENTION

The present invention provides a relatively low cost belt type filter for tank liquid filter applications in which the apparatus is substantially simplified. This arrangement includes an open-topped filter tank defining a tank interior space which receives the liquid to be filtered. A length of disposable filter belt is dispensed from a roll to extend through the interior of the tank across a sloping tank bottom, including a pervious section overlying a collection chamber, enabling filtering flow through the filter belt and into the collection chamber, while providing support for the filter media.

The filter belt side edges are received within recesses extending along side the filter tank interior space and which create a sealing pressure along each of the side edges of the filter belt within the tank to preclude bypass flow of the unfiltered liquid around the edges of the filter belt.

The filter belt is fed off a roll mounted above one end of the filter tank and is adapted to be indexed or incrementally advanced to dispose a fresh section of filter belt over the pervious section after continued filtering. This allows elimination of the build-up of filtered out solids or "cake" and corresponding increase in the vacuum generated by a circulating pump drawing liquid from the collection chamber by passing the loaded belt section out of the tank for disposal. Such belt advance may be either manually initiated or under automatic control in which a sensing of the vacuum at the suction side of the pump is sensed in order to initiate an advancing cycle.

A simplified, but reliable, arrangement is provided for advancing the filter belt including a roller tube extending across the filter tank opposite the filter belt supply roll and which receives the filter belt after passing out of the tank interior space.

Means are provided for clamping the filter belt to the roller tube and incrementally rotating the tube to draw a section of the filter belt out of the tank. A corresponding guide roller is mounted at the bottom of the tank interior space directly beneath the supply roll belt.

The simplified clamping arrangement consists of a pair of power cylinders mounted above either side of the filter belt and adapted to extend a pad into clamping engagement with the filter belt, pressing it against the surface of the roller tube. An indexing rotary drive is connected to a drive shaft extending through and mounted to the roller tube and also carries affixed thereto, a pair of support arms on each of which is supported one of the power cylinders. Upon pressurization of the power cylinders and actuation of the rotary drive means, the incremental advance of the disposable filter belt takes place.

This filter belt is advanced into a disposal container which receives the accumulated used filter belt for periodic disposal.

A pneumatic control system initiates the advancing of the filter belt by means of a manually activated valve or automatic control by means of a vacuum sensing switch which causes actuation of the power cylinders and, after a predetermined delay, initiates the incremental rotation of the rotary actuator.

During this interval outflow from the collection chamber is discontinued to allow a reduction in the vacuum such as to enable free advance of the filter belt.

DESCRIPTION OF THE DRAWINGS

FIG. 2 is a side elevational view of the belt filter arrangement according to the present invention.

DETAILED DESCRIPTION

Figure 1:
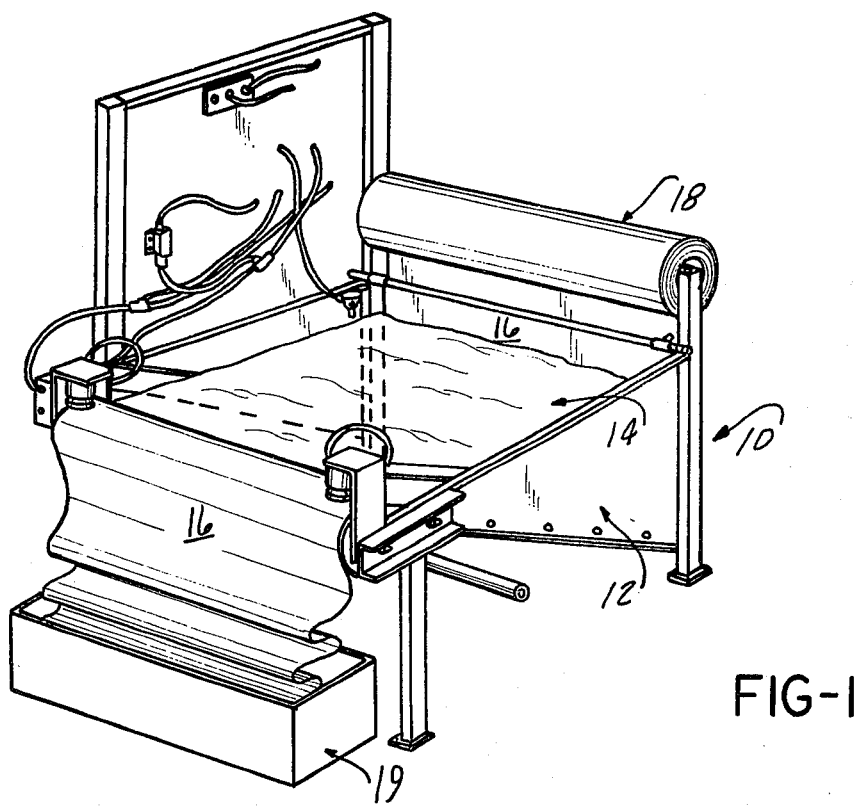
FIG. 1 is a perspective view of a belt filter arrangement according to the present invention, shown without the pump and accumulator tank.
Figure 4:
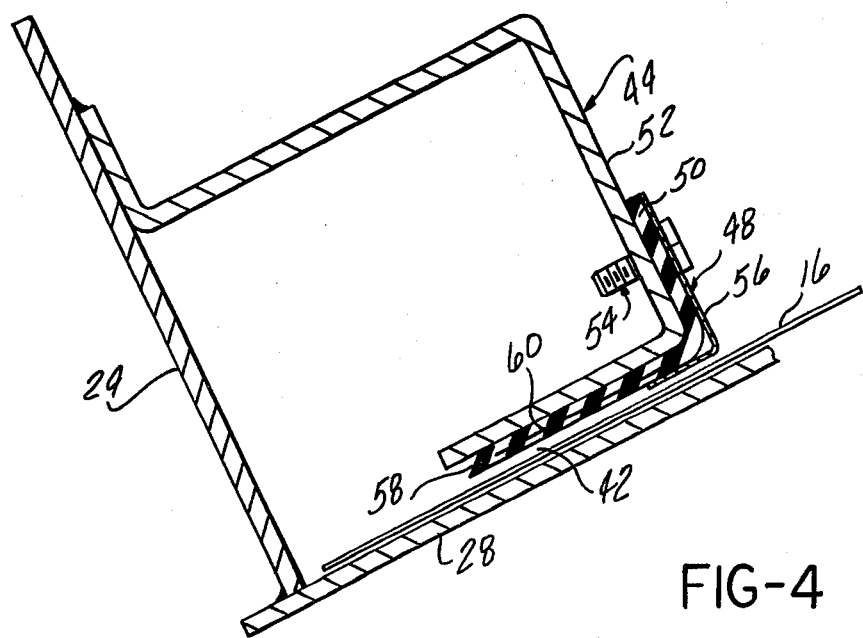
FIG. 4 is a fragmentary sectional view of the section 4—4 taken in FIG. 2.

Referring to FIG. 1, the belt filter 10 according to the present invention is generally comprised of an open-topped tank 12 defining an interior space 14 which is adapted to receive a quantity of liquid to be filtered. An elongated sheet of filter media 16, here comprised of a length of disposable filter belt, extends through the tank interior space 14 which is fed off a supply roll 18 supported at one end of the tank 12 to extend vertically downward against an endwall of the tank 12 and up the inclined bottom of the tank to the far end at the top of the tank 12.

The unfiltered liquid in the tank 12 passes through the filter belt 16 and is collected in a collection chamber to be described hereinafter, to be returned to the source of unfiltered liquid. The circulatory pump and accumulator tank are shown removed in FIG. 1 for the sake of clarity.

The filter belt 16 and accumulated cake is collected in a disposal container 19 positioned to receive the filter belt as it passes out of the tank 12 for periodic removal as a maintainence operation.

Figure 3:
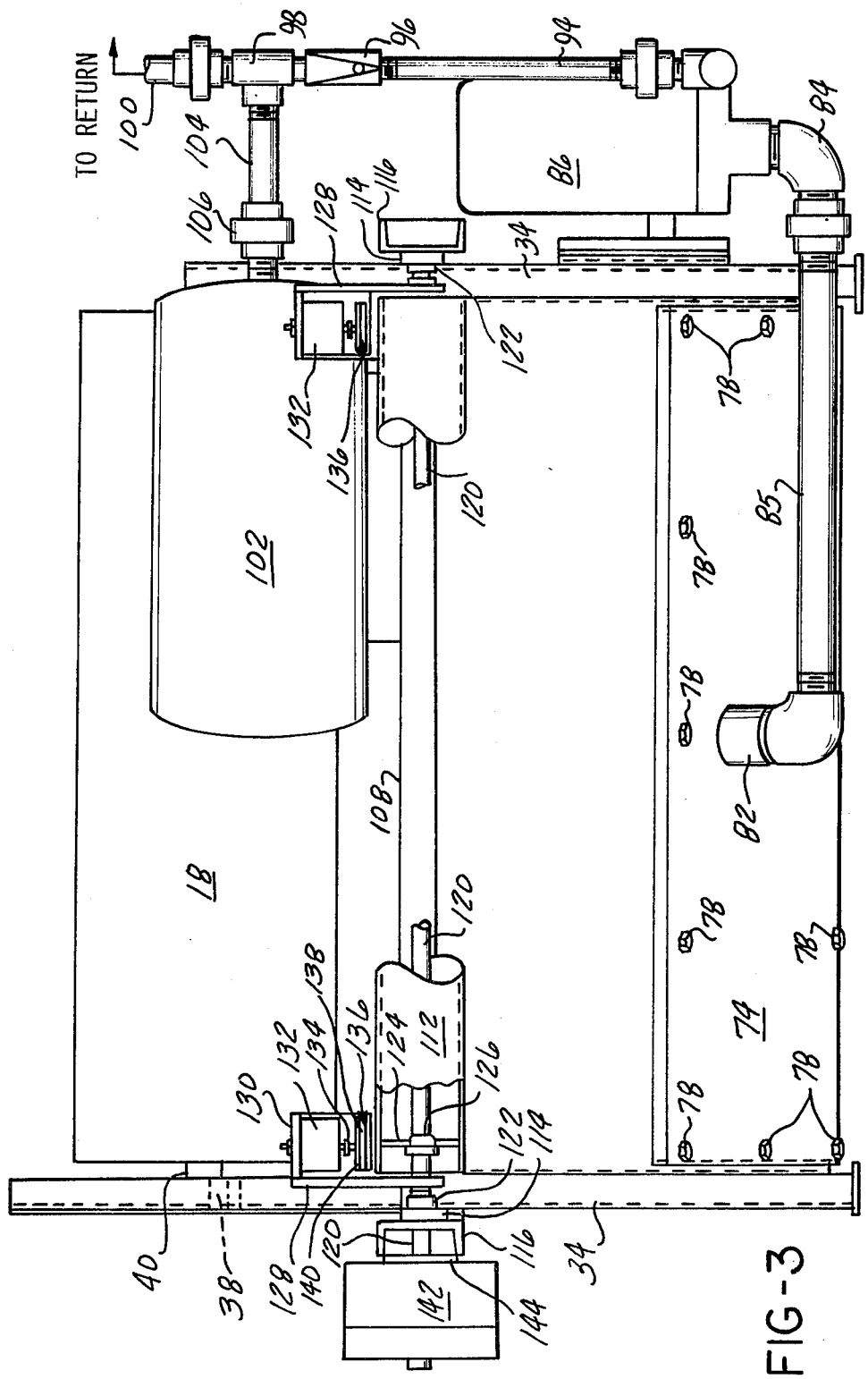
FIG. 3 is a rear elevational view of the belt filter and tank shown in FIG. 1.

Referring to FIGS. 2 and 3, further details of this arrangement are shown. The control panel 22 mounts certain control components, described hereinafter, which enable controlled indexing advance of the filter belt 16 through the tank interior space 14.

The tank 12 is formed with a pair of side panels 24 and end panel 26 and a sloping bottom panel 28 all joined as by welding to form the tank interior space 14. The end panel 26 extends generally vertically upwardly. A pair of upstanding legs 30 are provided welded on either side of the side panels 24 with flanged feet 32. The opposite end of the tank 12 is also provided with a pair of upstanding angles 34 upon having lower ends thereof provided with flanged feet 36 in similar fashion.

The supply roll 18 of filter belt 16 is supported on portions of the rear legs 30 extending above the tank 12 by appropriate "V" rests 38 supporting a rod 40 therein, as shown in FIG. 2.

The filter belt 16 has each of its side edges received in recesses 42 created by formed members 44 welded to the inside wall of each of the side panels 24 along the juncture of endwall 26 and the tank bottom 28 such as to leave a space comprising the recess 42, defined by an inwardly folded lip 46 integral with the formed members 44, and inside surface of the tank bottom 28 and end panel 26.

Each of the side edges of the filter belt 16 are adapted to be sealed against the inside surface of the end panel 26 and bottom 28 by means of inflatable seals 48 mounted within each of the recesses 42. The seals 48 extend substantially entirely through the interior space 14 so as to eliminate the need for end sealing of the filter belt 16.

The inflatable seals 48 each include a flange portion 50 mounted to the inside face 52 of formed member 44 by means of a series of sheet metal fasteners 54 and a sheet metal retainer angle 56.

The angled metal retainer 56 maintains a clearance space to enable insertion of the filter belts 16 into the recesses 42. The inflatable seals 48 each also include an inflatable tube section 58 which has an interior chamber 60 adapted to be pressurized by means of an end connection 62 secured to a manifold cross tube 64 extending above the rear end of the tank 12. Supply tubes 66 are clamped by hose clamps 68 for each of the inflatable seals 48. When pressurized, the chamber 60 expands so as to force the outer walls of the inflatable section 58 against the inwardly folded lip 46 and the interior face of the bottom panel 28 and end panel 26, sealing the filter belt 16 such as to preclude bypass flow of the unfiltered liquid around the otherwise free side edges of the filter belt 16.

The filtration process occurs in a lower region of the tank interior space 14 in which is located a pervious section 70 which may be provided by a perforated or drilled section of the bottom panel 28 which is interposed between the tank interior space 14 and a collection chamber 72 disposed immediately beneath the pervious section 70. The collection chamber 72 may be formed by a cover member 74.

The end panel 26 and bottom plate 28 formed with pervious section 70 may be advantageously formed of a single piece of sheet steel suitably formed. A pattern of holes 76 in the pervious section 70 enable flow of liquid from the interior tank space 14 into the collection chamber 72, through the overlying filter belt 16.

The cover 74 is removable to enable cleaning of the interior thereof by means of threaded fasteners 78 with suitable gasket 80 sealing the collection chamber 72.

A coupling member 82 is welded to the outside face of the formed cover member 74 to enable connection by means of coupling 84 to the suction side of a circulation pump 86, operation of which creates a vacuum in the collection chamber 72 to cause the liquid in the tank interior space 14 to be drawn into the collection chamber 72 in order to carry out the filtration process.

An outlet 88 of the section of the circulation pump 86 is connected via elbow 90 and couplings 92 and 94, check valve 96, and coupling element 98 to a return pipe 100 to enable continued flow of filtered liquid during short duration periodic shutdown of the circulation pump 86. A storage tank 102 may be provided, connected via tee 98, cross-pipe 104, and coupling 106 to receive the filtered liquid under pressure such that upon brief shutdown of the circulation pump 86 and closing of the check valve 96, continued supply of filtered liquid may be provided to the return pipe 100.

The accumulator tank 102 is mounted above the tank 14 by means of cross angles 108, and tank pedestal 110.

Means are provided for periodically advancing the filter belt 16 in the tank interior space 14, either under manual control or under automatic control, as will be described hereinafter, in order to move a section of clogged belt 16 out of the tank interior space 14 and move a fresh section of belt from the roll supply 18 into position over the pervious section 70. Such means here take the form of means for clamping the portion of the filter belt 16 extending out of the tank interior space 14 at the forward end of the tank 12 to a supporting roller tube 112 mounted just forward and above the tank 14 so as to have its upper surface in tangency with the bottom panel 28 of the tank 12. Means are also provided for incrementally rotating the roller tube 112 with the filter belt 16 clamped thereto to provide a linear advance of the filter belt 16 through the tank interior space 14 as described.

Movement of the filter belt 16 through the tank interior space 14 is guided by means of a cross tube 79 located at the apex of the end panel 26 and the bottom panel 28, cross tube 79 being welded within the tank interior space 14.

The roller tube 112 is rotatably supported on the frame by means of a support block 114 welded to each forward support leg 34 and respective support channels 116 bolted thereto at 118. A drive shaft 120 is supported in bearing assemblies 122 at either end, in turn supported on a respective support channel 116. Drive shaft 120 in turn rotatably supports the roller tube 112 by means of interior web plates 124 and bushings 126, located adjacent each outboard end of the support tube 112. A pair of swing arms 128 are rotatably connected to the drive shaft 120 which is immediately adjacent each end of the support tube 112, extending above the support tube 112. Over hung end plates 130 extend over the upper surface of each of the support tube ends such as to enable mounting a pair of power cylinders 132 to each swing arm assembly 128.

Each of the power cylinders 132 are provided with an actuating rod 134 to which is affixed an engagement pad assembly 136 having a neoprene disc 138 riveted to a backing plate 140.

Each of the power cylinders 132 each are downwardly facing such that upon actuation by pressurization thereof the filter belt 16 is caused to be clamped to the upper surface of the roller tube 112.

Means are also provided for incrementally rotating the assembly which means here are comprised of a rotary actuator 142 drivingly connected to one end of the driveshaft 120.

The rotary actuator 142 is mounted to a mounting plate 144, in turn secured to the left hand support channel 116 as seen in FIG. 3. The rotary actuator 142 may take many forms, such as an opposed piston, rack and pinion type actuator of the type well known to those skilled in the art.

A suitable device is commercially available under the tradename "Dynamate F790" manufactured by the Stone Valve Company. These rotary actuators are entirely enclosed and depend only on the use of air pressure for actuation, and may be advantageously combined with a pneumatic control system to be hereinafter described.

Accordingly, the filter belt 16 is initially clamped to the exterior of the support tube 112 by pressurization of the cylinders 132 and engagement of the neoprene discs 138. Subsequently, the rotary actuator 142 is activated to cause rotation of the support arms 128, causing incremental advance of the filter belt 16 to position a fresh section of the belt above the partition openings 76.

Figure 5:
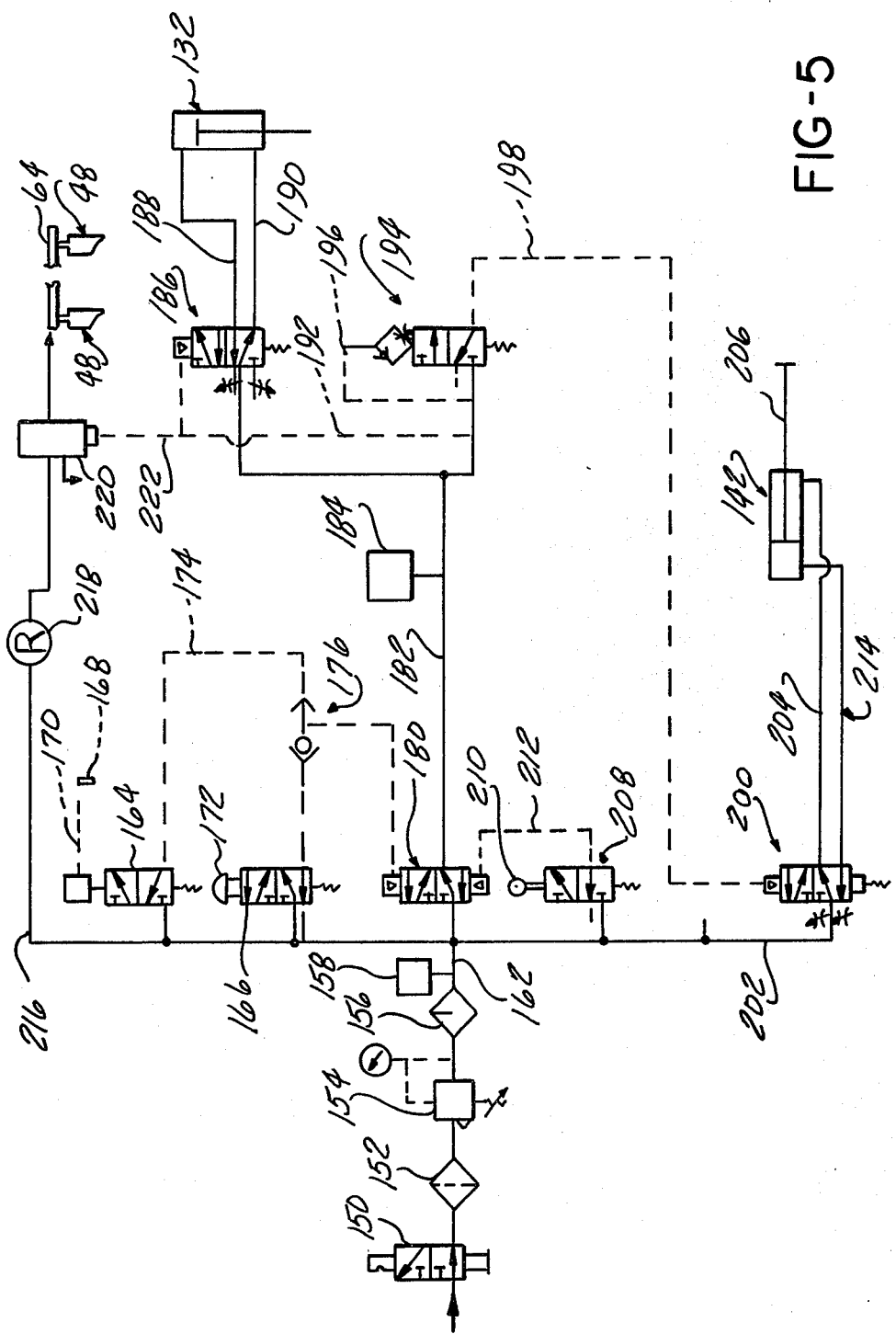
FIG. 5 is a schematic diagrammatic representation of a pneumatic control system associated with the filter according to the present invention.

Referring to FIG. 5, a suitable pneumatic control system is shown in diagrammatic form. It is understood, of course, that many variations of such control system may be employed and that the control system could also consist of electrical components rather than the pneumatic components shown therein, although such pneumatic control system offers certain advantages with regards to simplicity and compatibility with the other components of the blet filter arrangement 10.

The system is supplied from a source of pneumatic pressure via a shut off valve 150, filter 152, a pressure regulator 154 set, and a lubricator 156, all in a manner well known to those skilled in the art. A safety pressure switch 158 may also be provided to cause shut off of the system in the event of excessive or deficient pressure in the supply line 162.

The supply line 162 is connected both to a vacuum switch 164 and a manual valve 166. The vacuum switch 164 is adapted to sense the vacuum at the suction side of the circulating pump 86 as by a pressure tap 168 and line 170. The manual index valve 166 alternately responds to manual activation of button 172.

Upon activation of either the vacuum switch 164 or manual valve 166, pilot air pressure is transmitted to the outlet line 174, in turn connected to a shuttle valve 176 which allows either vacuum switch 164 or manual index valve 166 to pressurize pilot pressure line 178. Pilot pressure line 178 in turn is connected to a pilot valve 180 which, upon pressurization of the pilot line 178, causes communication of the supply line 162 with an outlet line 182. Outlet line 182 is connected in turn to a pressure switch 184 which causes shut down of the circulation pump 186 whenever an indexing cycle takes place. The outlet line 182 is also connected to a pneumatic pilot operated valve 186 having an outlet line 188 connected to the power cylinder 132 as well as enabling venting of the return line 190. Supply pressure is received via pilot pressure line 192 to initiate activation of the power cylinders 132 immediately upon operation of the pilot valve 180.

The outlet line 182 is also connected to a time delay valve 194 which receives pilot pressure via pilot pressure line 196 and after a predetermined built-in delay, on the order of 3 seconds, allows a pilot pressure to be communicated to pilot pressure line 198. The predetermined delay is to enable the vacuum condition existing at the interface of the filter belt 16 in the region overlying the openings 76 to degrade in order to reduce the force necessary to advance the filter belt. Upon generation of pressure in pilot pressure line 198, oscillator valve 200 is caused to shift to connect the supply pressure 162 via line 202 to the outlet line 204 to rotary actuator 142.

Upon advance of an operating shaft 206, a limit switch limit valve 208 is engaged which causes pilot pressure engagement with a cam 210 to enable generation of pilot pressure in a pilot pressure line 212 to again shift the pilot valve 180 to shut off pressure in the outlet line 182, deactivating the cylinders 132 and also causing the oscillator valve 200 to be moved to the return position pressurizing line 214 causing the rotary actuator 142 to be rotated to the return position.

The seals 48 are normally pressurized via the pneumatic system shown by means of a supply line tap 216 connected to the supply line 162 to pressurize the interior supply tube 64 via a regulator 218 and control valve 220. The regulator 218 sets a relatively low pressure, i.e., 7 p.s.i. in tube 64. The control valve 220 is shifted by pilot pressure in line 222 to deflate the seals 48 when the cylinders 132 are pressurized. Thus, the seals 48 are relaxed just prior to each indexing cycle.

This system thereby provides means for periodically or manually causing the filter belt 16 to be clamped to the exterior of the roller tube 112, and after a time delay sufficient to enable degrading of the vacuum conditions by cessation of operation of the circulation pump 86, activation of the rotary actuation 142 causing rotation of the driveshaft 108 and the roller tube 112 that the filter belt 16 clamped thereto moving a fresh section of the filter belt 16 into position.

Accordingly, it can be appreciated that the advantages of the present invention are achieved in that the filter belt itself is employed without the necessity for a chain support while sealing of the edges is ensured, and a relatively simple trouble-free operation provided.

Many variations are of course possible in the specific embodiment shown and described. For example, a separate clean tank and pump may be utilized, as is well known, to supply clean liquid during intervals in which outflow from the collection chamber is discontinued.

I claim:

1. A belt filter comprising:

an open-topped tank having an interior space adapted to receive a quantity of liquid to be filtered to establish a liquid level in said tank, said tank including a collection chamber and a partition separating said collection chamber and said tank interior space, said partition having openings therethrough to allow flow of liquid from said tank interior into said collection chamber through said partition openings;

a supply roll of elongated disposable filter media comprising a filter belt, said filter belt extending from a point above the level of liquid downwardly through said tank interior to overlie said partition and thence upwardly above the level of liquid in said tank;

means for collecting said filter belt media after passing through said tank interior;

means for periodically advancing said filter belt through said tank interior space to position a fresh section of filter belt over said partition;

said filter belt having side edges extending parallel to the direction of said advancing motion of said filter belt through said tank interior space;

inflatable sealing means extending substantially entirely along both of said side edges of said filter belt disposed in said tank interior space and control means for inflating said sealing means to seal the edges of said filter belt during filtering operations, and deflating said sealing means during said advance of said filter belt in said tank interior space; and, further including a pair of recesses formed in said tank and located within said tank interior space entirely through levels of liquid to be disposed in said tank, a respective one of said recesses extending along each side of said filter belt to receive said filter belt side edges and wherein said inflatable seal means includes a pair of inflatable tubes, one of said inflatable tubes extending along and within a respective one of said recesses so as to sealingly engage said filter belt side edges upon inflation.

2. The belt filter according to claim 1 wherein said means for advancing said filter belt through said tank interior space comprises a rotatably mounted tube extending to receive said filter belt thereover after passing through said tank interior space, means for releasably clamping said filter belt to said tube, and also including means for indexing said tube with said filter belt clamped thereto to advance said filter belt out of said tank interior space.

3. The belt filter according to claim 2 wherein said means for clamping said filter belt to said tube comprises power cylinders located above opposite edges of said filter belt overlying said tube, each of said power cylinders having an operating rod and a pad affixed thereto adapted to be forced against a respective one of said cylinder edges upon pressurization of said respective cylinders to clamp a respective edge of said filter belt to said tube.

4. The filter belt according to claim 3 wherein said means for said indexing said tube with said filter belt clamped thereto comprises a pair of support arms, one located on either side of said tube and having mounted thereto a respective one of said power cylinders;

and also including a drive shaft mounted within said tube and affixed at either end to a respective one of said support arms;

and further including rotary drive means for periodically rotating said drive shaft when said power cylinders are actuated to thereby rotate said power cylinders and clamped filter belt.

5. The filter belt according to claim 1 further including pump means for pumping liquid from said collection chamber to a return to establish flow from said tank interior space into said collection chamber through said filter belt.

6. The filter belt according to claim 5 further including control means discontinuing operation of said pump means during said advancing of said filter belt to reduce said vacuum pressure exerted on said belt against said partition during said movement of said filter belt.

7. The filter belt according to claim 5 further including vacuum sensor means sensing the vacuum created by operation of said pump means, control means causing said advancing of said filter belt upon development of a predetermined vacuum level sensed by said vacuum sensor means.

8. The filter belt according to claim 1 wherein each of said inflatable seal means comprises:

a flange portion and means securing each of said flange portions along the length thereof integral with said inflatable tube and wherein said inflatable seal is constructed of resilient material such that upon inflation of said inflatable tube a sealing pressure is exerted against a respective filter belt side edge disposed in a respective recess.

9. The filter belt according to claim 1 wherein said filter tank includes a substantially vertical end wall;

support means for rotatably supporting said roll of disposable filter belt material, and wherein said support means positions said filter belt roll immediately above said vertical endwall;

wherein said filter tank is further configured with a sloping bottom extending from the lower end of said vertical endwall to the opposite top side of said filter tank;

and further including a guide bar extending across the bottom of said filter tank adjacent said endwall, adapted to receive said filter belt, said filter belt passed therearound and extending along said filter tank bottom;

further including a rotatably tube mounted extending across said opposite top side of said tank adapted to receive said filter belt and wherein said means for advancing said filter belt through said tank interior space includes means for releasably clamping said filter belt to said rotatable tube and periodically indexing said tube to cause said advancing of said filter belt through said tank interior space.

* * * * *